US008228205B2

(12) United States Patent
Kohli et al.
(10) Patent No.: US 8,228,205 B2
(45) Date of Patent: Jul. 24, 2012

(54) VEHICLE LANE DISCRIMINATION IN AN ELECTRONIC TOLL COLLECTION SYSTEM

(75) Inventors: Japjeev Kohli, Waterloo (CA); Robert Lafferty, Georgetown (CA)

(73) Assignee: Mark IV IVHS, Inc., Flemington, NJ (US)

( * ) Notice: Subject to any disclaimer, the term of this patent is extended or adjusted under 35 U.S.C. 154(b) by 379 days.

(21) Appl. No.: 12/357,898

(22) Filed: Jan. 22, 2009

(65) Prior Publication Data

US 2009/0184847 A1 Jul. 23, 2009

Related U.S. Application Data

(60) Provisional application No. 61/022,864, filed on Jan. 23, 2008.

(51) Int. Cl.
*H04Q 5/22* (2006.01)

(52) U.S. Cl. ...................................... 340/605; 340/10.1

(58) Field of Classification Search .................. 340/605, 340/10.1, 933

See application file for complete search history.

(56) References Cited

U.S. PATENT DOCUMENTS

| | | | | |
|---|---|---|---|---|
| 4,988,042 | A * | 1/1991 | Del Prato et al. | 239/263 |
| 6,025,799 | A | 2/2000 | Ho et al. | |
| 6,191,705 | B1 | 2/2001 | Oomen et al. | |
| 6,219,613 | B1 | 4/2001 | Terrier et al. | |
| 6,661,352 | B2 | 12/2003 | Tiernay et al. | |
| 7,233,260 | B2 | 6/2007 | Tang et al. | |
| 7,385,525 | B2 | 6/2008 | Ho et al. | |
| 7,479,896 | B2 | 1/2009 | Ho et al. | |
| 2007/0077896 | A1 | 4/2007 | Ho et al. | |
| 2008/0129545 | A1 * | 6/2008 | Johnson et al. | 340/933 |

* cited by examiner

*Primary Examiner* — Shirley Lu

(74) *Attorney, Agent, or Firm* — Hanley, Flight & Zimmerman, LLC

(57) ABSTRACT

A vehicle position determination system for determining the position of a moving vehicle in a multi-lane roadway. Two or more roadway antennas each periodically transmit an identifier that is associated with and unique to the antenna to a transponder located in the moving vehicle. As the moving vehicle passes through the coverage zone of the antennas, the transponder counts the number of times that it receives each unique identifier and reports this information to a roadside controller. Based on this information, the roadside controller can determine a probable location of the moving vehicle. The vehicle location information can be provided to an imaging system to discriminate between transponder and non-transponder equipped vehicles.

7 Claims, 6 Drawing Sheets

VEHICLE LANE DISCRIMINATION IN AN ELECTRONIC TOLL COLLECTION SYSTEM

CROSS REFERENCE TO RELATED APPLICATION

This application claims the benefit of U.S. Provisional Application No. 61/022,864, filed Jan. 23, 2008, the entirety of which is incorporated by reference.

FIELD OF THE INVENTION

The present invention relates to electronic toll collection systems and, in particular, to methods and systems for determining a lane position of a moving vehicle having a transponder in a multi-lane roadway.

BACKGROUND OF THE INVENTION

Electronic toll collection systems are commonly used to facilitate the collection of a toll from a moving vehicle traveling on a toll-roadway.

Automatic Vehicle Identification ("AVI") is the process of determining the identity of a vehicle on the roadway. Typically, electronic toll systems use a series of antennas that are mounted near the roadway which provide coverage zones that extend the width of a lane. Radio frequency ("RF") transponders are mounted on or within a vehicle to communicate with the antennas. A roadside AVI reader typically interrogates the transponder using the antenna. Typically, the roadside reader is connected to a vehicle detector and imaging system which permits vehicles to be detected, classified, and photographed, and the license plate numbers analyzed in order to permit the operator of the toll system to apply to appropriate charges to the owner of the vehicle.

In order to ensure proper tracking and identification of vehicles, it is often necessary to identify which lane a vehicle is located in. For example, lane identification is often used to separate vehicles that are equipped with transponders from vehicles that are not equipped with transponders in order to associate the video images of their license plates with the vehicles that are not equipped. In order to do so, the electronic toll collection system must clearly identify where the subject vehicle is located within the multi-lane roadway.

Lane identification is made difficult since RF capture zones may overlap. Such overlap is typically by design since it is necessary to ensure that there are no dark spots along the width of the roadway where the vehicle will be outside of a coverage zone.

It is therefore desirable to provide a vehicle position determination system and method having improved accuracy for determining the position of a moving vehicle having a transponder in an electronic toll system.

SUMMARY OF THE INVENTION

The present application describes systems and methods for determining the location of a moving vehicle in a multi-lane roadway.

In one aspect, the present application describes a vehicle position determination system for determining a position of a moving vehicle having a transponder in a multi-lane roadway. The transponder is configured to transmit a probable lane response signal which is based on the number of instances the transponder has received a transmission from one or more communication sources. The determination system comprises two or more roadway antennas for receiving the probable lane response signal from the transponder. The roadway antennas have partially overlapped coverage zones and each roadway antenna has a unique identifier associated therewith. The determination system also includes a controller that is configured to cause each roadway antenna to periodically transmit its unique identifier.

In another aspect, the present application provides a transponder for a vehicle position determination system for tracking the position of a moving vehicle in a multi-lane roadway. The vehicle positioning system has at least two or more roadway antennas having partially overlapped coverage areas. Each roadway antenna has a unique identifier associated therewith and each roadway antenna periodically transmits its unique identifier. The transponder comprises a transponder antenna for receiving the unique identifier from at least one roadway antenna and transmitting a probable lane response signal to at least one roadway antenna. The transponder further comprises memory for storing at least one counter. Each counter is associated with one of the identifiers. The transponder also comprises a controller configured to increment the counter associated with one of the identifiers in response to the receipt of that identifier by the transponder antenna. The controller is configured to cause the transponder antenna to transmit the probable lane response signal to the roadway antennas. The probable lane response signal is based on an accumulated value in each counter.

In yet a further aspect, the present application provides a method of determining a position of a moving vehicle having a transponder in a multi-lane roadway. The multi-lane roadway has two or more roadway antennas having partially overlapped coverage zones. Each roadway antenna has a unique identifier associated therewith. The method comprises the steps of (a) receiving from any one of the roadway antennas an RF trigger signal and its associated unique identifier; (b) incrementing a counter associated with the unique identifier in response to the receipt thereof; (c) generating a probable lane response signal based upon the value in the counter associated with each unique identifier; and (d) transmitting the probable lane response signal to at least one of the roadway antennas.

Other aspects and features of the present application will be apparent to those of ordinary skill in the art from a review of the following detailed description when considered in conjunction with the drawings.

BRIEF DESCRIPTION OF THE DRAWINGS

Reference will now be made, by way of example, to the accompanying drawings which show an embodiment of the present application, and in which.

Similar reference numerals are used in different figures to denote similar components.

DESCRIPTION OF SPECIFIC EMBODIMENTS

Figure 1:
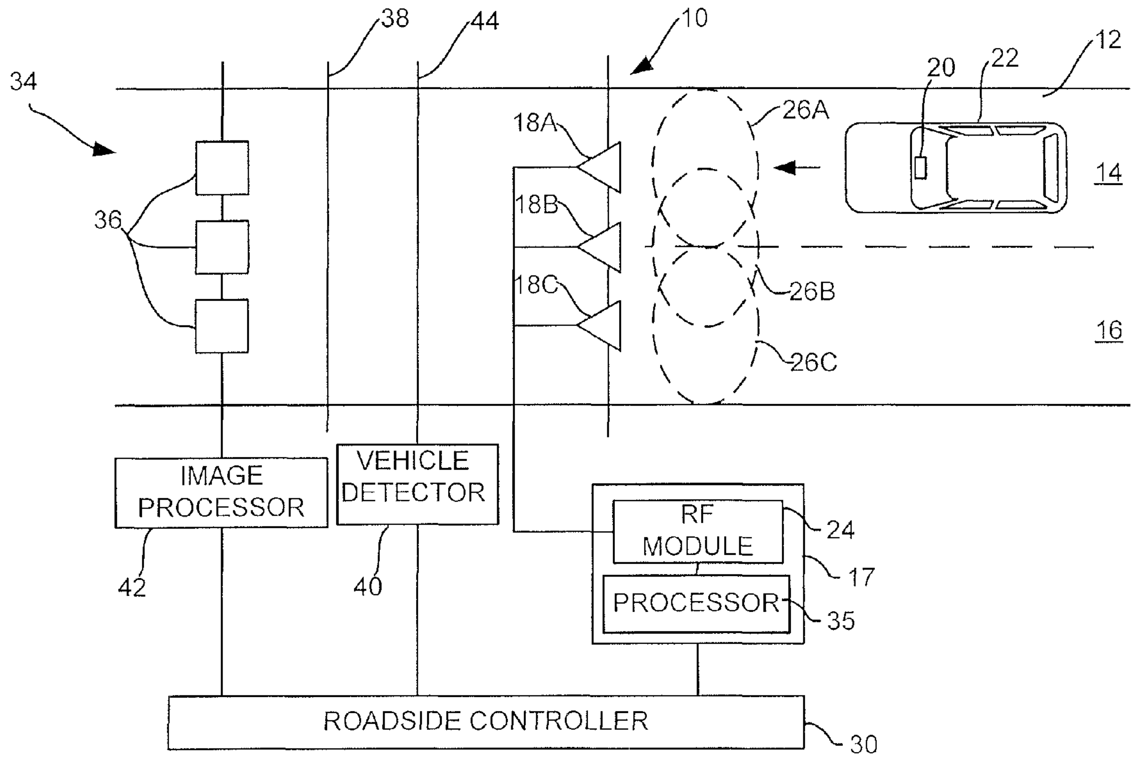
FIG. 1 shows a plan view and a block diagram of an example embodiment of a vehicle position determination system in a two-lane open road toll application.

With reference to FIG. 1, there is shown an embodiment of a vehicle position determination system, illustrated generally by reference numeral 10. As shown in FIG. 1, the vehicle position determination system is applied to a roadway 12 having first and second adjacent lanes 14 and 16. The roadway 12 may be a two lane access roadway leading towards or away from a toll highway. The vehicle position determination system 10 includes three roadway antennas 18A, 18B and 18C, each of which is connected to signal processing means, namely an Automatic Vehicle Identification ("AVI") reader 17. The AVI reader 17 processes signals that are sent and received by the roadway antennas 18A, 18B and 18C, and includes a processor 35 and a Radio Frequency (RF) module 24.

The RF module 24 is configured to modulate signals from the processor 35 for transmission as RF signals over the roadway antennas 18A, 18B and 18C, and to de-modulate RF signals received by the roadway antennas 18A, 18B and 18C into a form suitable for use by the processor 35. In this regard, the AVI reader 17 employs hardware and signal processing techniques that are well known in the art. The processor 35 includes a programmable processing unit, volatile and non-volatile memory storing instructions and data necessary for the operation of the processor 35, and communications interfaces to permit the processor 35 to communicate with RF module 24 and a roadside controller 30.

The roadway antennas 18A, 18B and 18C, and AVI reader 17 function to trigger or activate a transponder 20 (shown in the windshield of vehicle 22) to record information and to acknowledge to the transponder 20 that a validated exchange has taken place. The roadway antennas 18A, 18B and 18C are directional transmit and receive antennas which, in the illustrated embodiment, have an orientation such that each of the roadway antennas 18A, 18B and 18C can only receive signals transmitted from a transponder when the transponder is located within a roughly elliptical coverage zone associated with the antenna.

The roadway antennas 18A, 18B and 18C are located above the roadway 12 and arranged such that the roadway antenna 18A has a generally elliptical coverage zone 26A that extends across the first lane 14, roadway antenna 18B has a generally elliptical coverage zone 26B which extends from approximately the center of lane 14 to the center of lane 16, and the roadway antenna 18C has a generally elliptical coverage zone 26C which extends across the entire width of the second lane 16. Each of the elliptical coverage zones 26A, 26B and 26C are of an approximately similar elliptical shape and cover an approximately similar sized area. Furthermore, the coverage zones 26A, 26B and 26C are aligned side-by-side along an axis 28 that is orthogonal to the travel path along roadway 12. In the embodiment illustrated, the major axes of the elliptical coverage zones 26A, 26B and 26C are co-linear with each other, and extend orthogonally to the direction of travel. As is apparent from FIG. 1, the coverage zone 26A provides complete coverage of the first lane 14, and the coverage zone 26C provides complete coverage of the second lane 16. The coverage zone 26B overlaps both of the coverage zones 26A and 26C.

It will be understood that although the coverage zones 26A, 26B and 26C are illustrated as having identical, perfect elliptical shapes, in reality the actual shapes of the coverage zones 26A, 26B and 26C will typically not be perfectly elliptical, but will have a shape that is dependent upon a number of factors, including RF reflections or interference caused by nearby structures, the antenna pattern and mounting orientation. Prior to operation of the vehicle position determination system 10, the actual approximate coverage shape and size of each of the coverage zones may be determined through well known mapping or approximation techniques, and stored by the processor 35 of the vehicle position determination system 10 such that the size, shape and location of each of the coverage areas 26A, 26B and 26C are generally known and predetermined by the system.

It will also be understood that, although elliptical coverage zones are disclosed in the above embodiment, other shapes could also be used for the coverage area.

The antennas 18A, 18B, and 18C are typically designed such that, at any given time, there can only be one transponder located within each coverage zone 26A, 26B, 26C.

The AVI reader 17 is connected to a roadside controller 30. In open road toll systems, the vehicle position determination system 10 will often be used in conjunction with a vehicle imaging system, which is indicated generally by reference numeral 34. The imaging system 34 includes an image processor 42 to which is connected a number of cameras 36 arranged to cover the width of the roadway for capturing images of vehicles as they cross a camera line 38 that extends orthogonally across the roadway 12. The image processor 42 is connected to roadside controller 30, and operation of the cameras 36 is synchronized by the roadside controller 30 in conjunction with a vehicle detector 40. The vehicle detector 40, which is connected to the roadside controller 30, detects when a vehicle has crossed a vehicle detection line 44 that extends orthogonally across the roadway 12, which is located before the camera line 38 (relative to the direction of travel). The output of the vehicle detector 40 is used by the roadside controller 30 to control the operation of the cameras 36. The vehicle detector 40 can take a number of different configurations that are well known in the art, for example it can be a device which detects the obstruction of light by an object.

Figure 2:
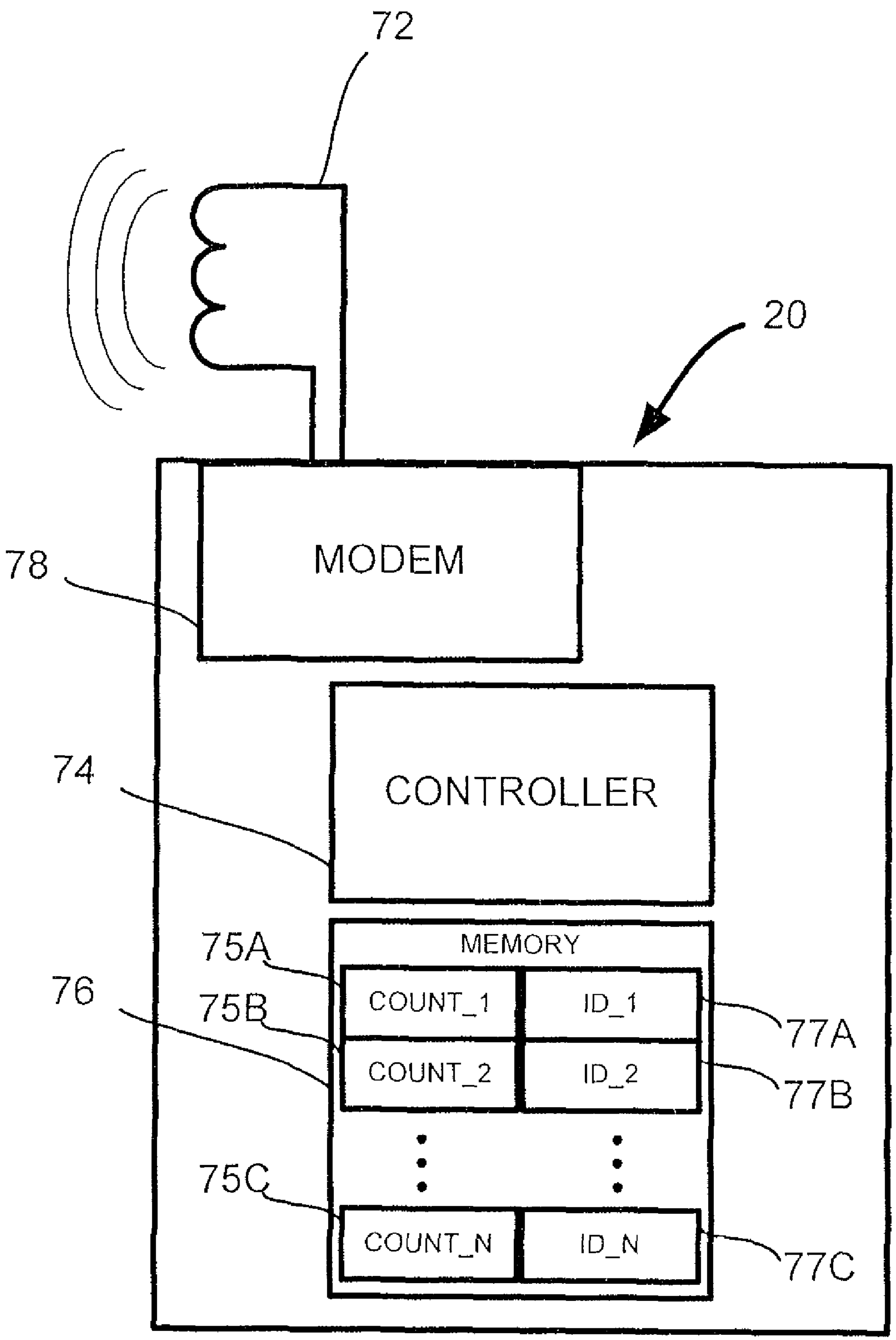
FIG. 2 shows a block diagram of an example embodiment of a transponder for use in the vehicle position determination system of FIG. 1.

As shown in FIG. 1, the vehicle detection system utilizes a transponder 20 that is located in a vehicle 22 traveling on the roadway 12. Referring now to FIG. 2, the transponder 20 has a transponder antenna 72 for receiving an RF communication signal that has been transmitted by the roadway antennas 18A, 18B, 18C.

The transponder 20 also has a modem 78 that is configured to de-modulate RF signals received by the transponder antenna 72 into a form suitable for use by a controller 74. The modem 78 is also configured to modulate signals from the controller 74 for transmission as an RF signal over the transponder antenna 72.

The transponder 20 also includes a memory 76 that is connected to the controller 74. The controller 74 may access the memory 76 to store and retrieve data. The memory 76 may be, for example, random access memory (RAM), or flash memory. In one embodiment, the memory 76 is the integrated memory of a microcontroller.

The controller 74 may be implemented by way of a suitably programmed microcontroller or microprocessor. Software control of the controller 74 may be by way of operating programs stored in local memory, such as memory 76, or firmware within the transponder 20. The controller 74 may also be implemented by way of an application specific integrated circuit ("ASIC") or a field programmable gate array ("FPGA").

Figure 3:
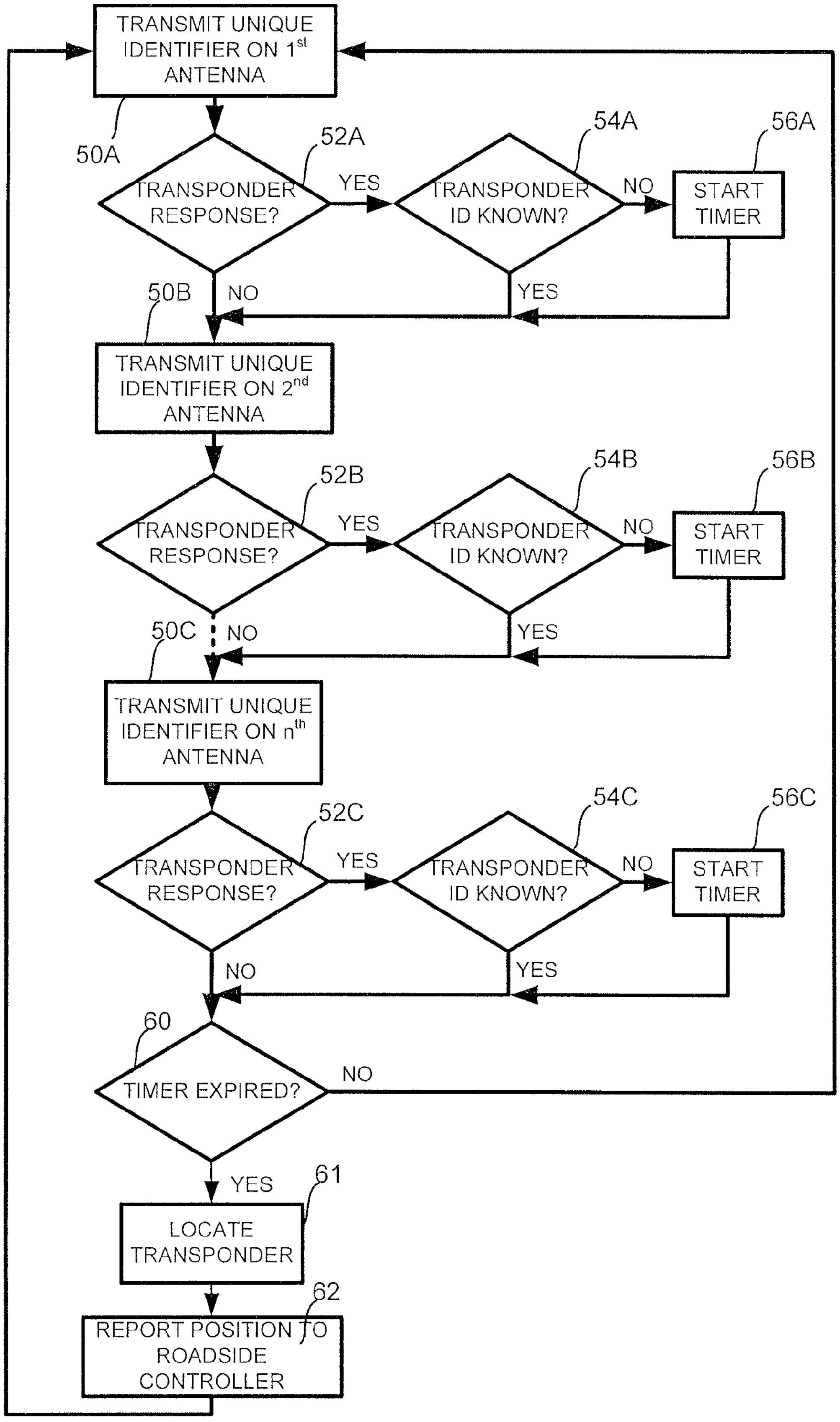
FIG. 3 is a flowchart showing the operation of the vehicle position determination system of FIG. 1.
Figure 4:
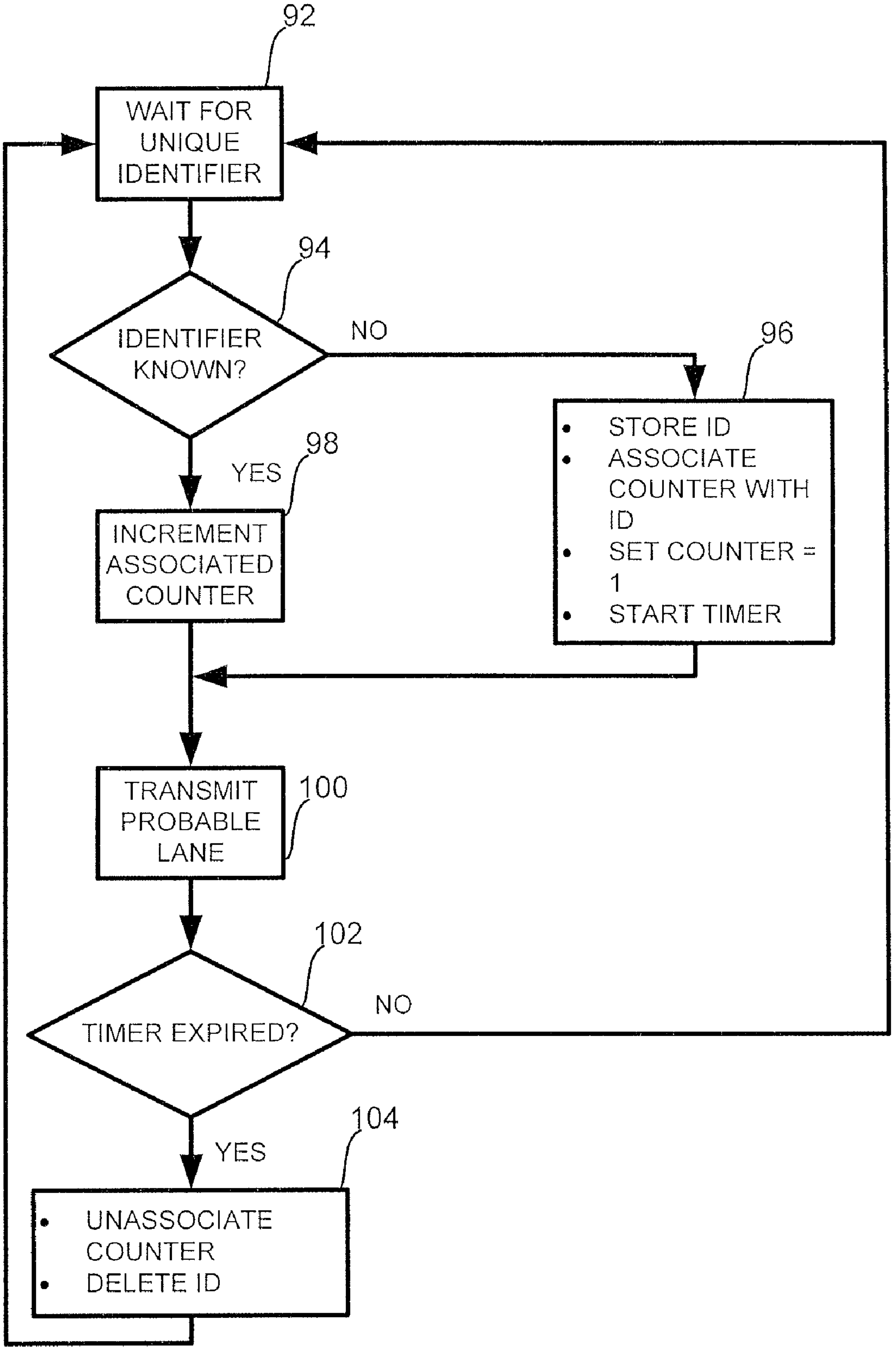
FIG. 4 shows a flowchart illustrating the operation of the transponder of FIG. 2.

Referring now to FIG. 1 and the flow charts of FIGS. 3 and 4, the operation of a vehicle position determination system of the present invention will now be described. FIG. 3 illustrates the operation of roadside equipment portion of the vehicle position determination system 10. The roadside equipment portion of the vehicle position determination system 10 includes the roadside antennas 18A, 18B, 18C and the AVI reader 17. FIG. 4 illustrates the operation of the transponder portion of the vehicle position determination system.

Each roadway antenna 18A, 18B, and 18C is assigned a unique identifier that is associated with and used to identify that antenna. The unique identifier for each antenna may be stored in the AVI reader 17. The AVI reader 17 is configured to periodically cause each roadway antenna 18A, 18B, and 18C to transmit the unique identifier that is associated with that antenna (Steps 50A, 50B, and 50C). In this way, it is possible for the transponder 20 to receive a signal from one of the roadway antennas 18A, 18B, 18C containing information indicating which of the antennas the signal originated from.

In one embodiment, a trigger signal may be periodically transmitted from the AVI reader 17 using the roadway antennas 18A, 18B, 18C. The trigger signal may be used to wake up any transponders which are within the coverage area 26A, 26B, 26C of the roadway antennas 18A, 18B, 18C. In this embodiment, the transmission of the unique identifier may occur, for example, within or shortly after the transmission of the trigger signal.

Referring now to FIG. 4, the transponder 20 waits for an identification signal to be received from the roadway antennas 18A, 18B, 18C at the transponder antenna 72 (Step 92). When the transponder 20 receives an identification signal, the controller 74 determines if the identifier is known (Step 94) (i.e. whether the transponder 20 has previously engaged in communications with an antenna having that unique identifier). If the identifier is not known, the controller 74 stores the unique identifier and initiates a counter 75A, 75B, or 75C in memory 76 to be associated with that particular identifier 77A, 77B, 77C (Step 96). Typically, the controller 74 initiates the counter by setting it to a value of one to indicate that the transponder has now received one signal from the antenna having that unique identifier.

As part of the initialization process, the controller 74 starts a session timer which monitors the period of time that the transponder 20 has been able to receive a signal from the roadway antennas 18A, 18B and 18C. In one embodiment, each timer is associated with a unique identifier and there may be multiple timers, each timer being associated with a different unique identifier. The timers provide a mechanism for resetting the counters 75A, 75B, 75C and for removing the association between a counter and a particular unique identifier 77A, 77B, 77C once the vehicle 22 has traveled outside the coverage zones 26A, 26B, 26C for the roadway antennas 18A, 18B, 18C.

In one embodiment, the controller 74 will determine that the timer has expired if the timer reaches a predetermined threshold which is based on the maximum expected size of the coverage zones 26A, 26B, and 26C.

In another embodiment, a single timer is used for all unique identifiers and the timer will be reset each time a unique identifier is received. That is, there is a single timer which has no association with a particular identifier. The timer is used to track the period of time since the last transmission was received by the transponder. In this embodiment, the controller 74 will determine that the timer has expired if the timer reaches a predetermined threshold, indicating that it has been too long since the transponder 20 has received communications from one of the roadway antennas 18A, 18B, and 18C, and the transponder 20 must be outside the coverage zones 26A, 26B, and 26C of the roadway antennas 18A, 18B, and 18C.

In another embodiment, a single timer is used for all unique identifiers and the timer will begin timing when the transponder 20 receives its first communication from one of the roadway antennas 18A, 18B and 18C and will expire after a predetermined period of time has elapsed since the first communication was received. The predetermined period of time is selected so that it is greater than the typical period of time for a vehicle 22 carrying the transponder 20 to travel through the coverage zone 26A, 26B, or 26C, but less than the period of time for the vehicle 22 to enter a new coverage zone which is downstream from the coverage zone 26A, 26B, or 26C. For example, in some systems the predetermined period of time may be 300 seconds.

The predetermined threshold after which it will be determined that a timer has expired may be a static value programmed into the transponder 20 or it may be a dynamic value that depends on size of the coverage zone 26A, 26B, 26C. In the latter case, the AVI reader 17 may communicate an updated value to the transponder 20 using one or more of the roadway antennas 18A, 18B and 18C.

In the embodiments discussed above, the counter 75A, 75B, 75C or counters, identifying the number of times the transponder 20 has communicated with each of the antennas 18A, 18B and 18C, may be reset to zero and the unique identifier(s) deleted from memory 76 when the timer expires (Steps 102 and 104). Purging the memory 76 ensures that erroneous tracking data will not be produced if the vehicle 22 travels through the same coverage zone 26A, 26B, 26C at a later date or time. Once the memory 76 is purged, the unique identifier associated with the roadway antenna 18A, 18B, 18C will appear unknown to the transponder 20. Purging the memory 76 also ensures that the memory 76 does not become overburdened with information that is no longer needed.

When the transponder 20 receives an identifier that is known to it, and for which a counter 75A, 75B, 75C has already been initialized, the controller 74 increments the counter 75A, 75B, 75C associated with that identifier (Step 98).

After the counter 75A, 75B, 75C is either initialized or incremented (Steps 96 and 98), the transponder 20 transmits a probable lane signal to the roadway antennas 18A, 18B, and 18C using the transponder antenna 72 (Step 100).

The probable lane signal may be a normal response signal that is sent in reply to each trigger signal. The response signal contains transponder information that is read from the transponder memory 76. If the unique identifiers 77A, 77B, 77C and their associated counters 75A, 75B, 75C are stored in the memory 76 in a suitable location, they will be included as part of the response signal each time the transponder 20 receives a trigger signal from one of the antennas 18A, 18B, 18C. In this embodiment, the transponder 20 does not, itself, determine in which lane the vehicle is most probably located. The transponder 20 transmits a probable lane signal that includes each unique identifier that has been received by the transponder 20 and the accumulated number of times each unique identifier has been received by the transponder 20. This information is received at the roadway antennas 18A, 18B, 18C by the AVI reader 17 and the AVI reader 17 determines the most probable lane based on the information.

In another embodiment, the controller 74 assists in determining the most probable location of the vehicle based on the accumulated value in each of the counters 75A, 75B, 75C. The controller 74 determines the probable location of the vehicle by determining which counter 75A, 75B, 75C in the memory 76 has the greatest accumulated count. The controller 74 then determines which unique identifier 77A, 77B, 77C is associated with this counter and transmits a signal representing the unique identifier to the roadway antennas 18A, 18B, 18C. In the event that there is a tie for the highest counter, the controller 74 may be programmed to arbitrarily select one of the unique identifiers associated with one of the counters 75A, 75B, 75C having the highest count. The selected unique identifier will then be transmitted using the transponder antenna 72. Alternatively, the controller 74 may be programmed to transmit the unique identifier associated with both counters 75A, 75B, 75C in the event of a tie.

In some embodiments, the suitable location in memory 76 for storing the counters 75A, 75B, and 75C and the unique identifiers 77A, 77B, 77C may be a temporary storage area of the memory 76 such as a scratchpad. In another embodiment, the suitable location may be a dedicated location of the memory 76.

The controller 74 may be programmed to transmit a transponder ID code that is unique to that transponder 20 along with the probable lane information. The transponder ID code is used by the AVI reader 17 to associate the probable lane signal with the correct transponder 20.

Referring again to FIG. 4, the AVI reader 17 may be configured to wait for a response from the transponder 20 after each transmission of a unique identifier using one of the roadway antennas 18A, 18B, 18C (Steps 52A, 52B, 52C). As discussed above, the response typically includes the probable lane information and the transponder ID code. If a response is received at the roadway antennas 18A, 18B, 18C, the transponder 20 determines whether the transponder ID code is known to the AVI reader 17. An unknown transponder ID code signifies that a previously untracked transponder 20 has entered the coverage zones 26A, 26B, 26C. For each previously unknown transponder 20, a tracking initialization step 56A, 56B, 56C is performed in which the transponder ID code is stored by AVI reader 17 (thereby making the transponder ID a known ID during subsequent interrogations). For each transponder 20 it tracks, the AVI reader 17 maintains a transponder specific timer to count down a sampling time period for the transponder 20.

In one embodiment, the sampling time period, which is commonly known as the voting time, is of a predetermined duration that is generally sufficient to allow an adequate number of unique identifier transmissions to occur for the AVI reader 17 to determine, with acceptable accuracy, the location of transponder and vehicle 22. The predetermined time period is application specific (depending on many factors, for example how quick the positional data is needed by down road equipment such as imaging system 34, and the maximum speed of vehicles on the roadway). Preferably, the sampling time period should be set such that in the majority of cases, the vehicle will have at least passed axis 28 when the time period expires.

In another possible embodiment of the invention, the sampling time period can be set to vary according to the speed of the particular vehicle being tracked. For example, the AVI reader 17 could be configured to end the sampling time in the event that none of the antennas 18A, 18B or 18C receive a probable lane response signal from a transponder after transmitting a unique identifier using each of the antennas 18A, 18B, and 18C (the absence of a response indicating the vehicle has already passed through the coverage zone).

As noted above, the routine of transmitting a unique identifier and awaiting a response is performed for each of the coverage zones 26A, 26B, 26C. After a unique identifier has been transmitted using each roadway antenna 18A, 18B, 18C, the AVI processor 35 checks to see if the sampling time period or voting time for any of the transponders 20 that are currently being tracked have expired (step 60). For any transponders 20 for which the sampling time period has expired, the AVI processor 35 creates an electronic report that includes the probable position, transponder identification data, and any other information specific to the AVI system, and provides the electronic report to the roadside controller 30. It also erases the transponder ID from its list of "known" transponder IDs as it is no longer tracking the transponder (Step 62).

Depending on the format in which the probable lane signal is received from the transponder 20 by the AVI reader 17, the AVI processor 35 may need to perform an additional step of determining the probable lane location of the vehicle based on the probable lane signal prior to communicating a report to the roadside controller 35 (Step 61). For example, in one embodiment discussed above, the transponder 20 does not, itself, determine which lane the vehicle 22 is most probably located in. In this embodiment, the transponder 20 transmits a probable lane signal that includes each unique identifier that the transponder 20 has received and the current count of the number of times that each unique identifier has been received by the transponder 20. In this embodiment, the AVI reader 17 determines which roadway antenna 18A, 18B, 18C the transponder 20 received the most unique identification signals from and reports corresponding lane information to the controller. For example, in the embodiment of FIG. 1, the AVI reader 17 can be configured to classify the transponder as being: (1) in lane 14 if the total count is highest for roadway antenna 18A; (2) in lane 16 if the total count is highest for roadway antenna 18B; or (3) in the center of the roadway 12 if the count from the roadway antenna 18B is the highest. In the event of a tie, the AVI reader 17 may be programmed to arbitrarily select one of the two possible positions.

Figure 5:
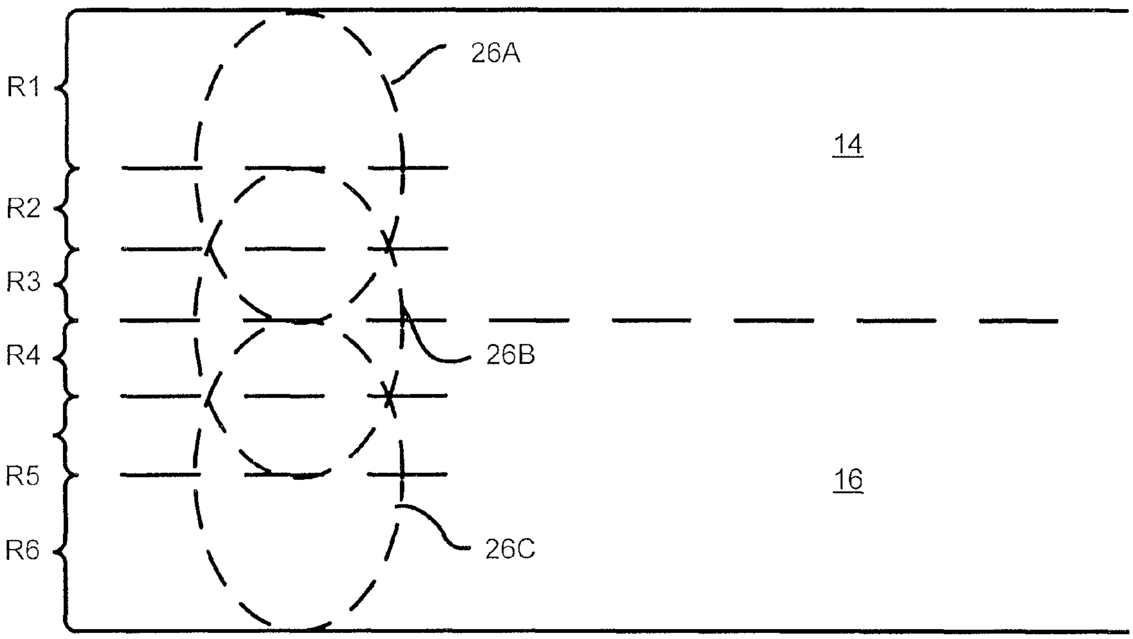
FIG. 5 is a partial plan view showing an example embodiment where the roadway is divided into ranges.

Interpolation analysis, involving comparing the ratios of total counts from the different coverage areas to predetermined thresholds, could be used to provide a higher level of resolution. For example, as shown in FIG. 5, the roadway 12 can be divided into ranges R1-R6 across its width, with position being determined according to the following exemplary interpolation algorithm:

IF COUNT A>0 and COUNT B=0 THEN LOCATION=R1 ELSE
IF COUNT A>0 AND COUNT A/COUNT B>1 THEN LOCATION=R2 ELSE
IF COUNT A>0 AND COUNT A/COUNT B≦1 THEN LOCATION=R3 ELSE
IF COUNT A=0 AND COUNT B>0 AND COUNT C=0 THEN LOCATION=R3 ELSE
IF COUNT B>0 AND COUNT B/COUNT C≧1 THEN LOCATION=R4 ELSE
IF COUNT B>0 AND COUNT B/COUNT C<1 THEN LOCATION=R5 ELSE LOCATION=R6

Where: COUNT A, COUNT B and COUNT C are the total number of unique identifiers received by the transponder 20 from the antennas 18A, 18B and 18C, respectively.

As will be noted from the above algorithm, the AVI reader 17 is configured to arbitrarily select a suitable position when the transponder path follows directly along a line where two ranges meet (for example, following the juncture line between range R2 and R3 will result in a location determination of R3 in accordance with the above algorithm).

The electronic reports that are generated by the vehicle position determination system 10 can be used by the vehicle imaging system 34 to provide improved accuracy in determining between transponder equipped and unequipped vehicles. The presence or absence of an electronic report, together with reliable location information, can be used to qualify the operation of the imaging system 34 so that unnecessary images can be eliminated altogether, or to improve the accuracy of processing images that are taken.

Typically, at some time during the sampling time, the AVI reader 17 will cause one of the antennas to send a "write" signal to the transponder 20 to provide the transponder 20 with whatever data is required by the toll system. Thus, it will be appreciated that the informational content of the interrogation signals and data signals can vary during the sample time period, however the actual content of such signals does not affect the response data signal count logs kept by the determination system 10.

It will be appreciated that in order to provide the optimum accuracy for a toll collection system such as that shown in FIG. 1, it is desirable to align the generation of an electronic report for a vehicle with the detection of the vehicle by detector 40 as closely as possible in order to avoid intermediate changes in the vehicle position. Thus, coverage zones 26A, 26B and 26B are preferably located as close as possible to detection line 44 as the system constraints allow. The fact that the coverage zones 26A, 26B, and 26C are aligned co-linearly across the roadway allows a shorter total sampling period than if they were offset (relative to the direction of traffic) thereby increasing accuracy.

It will be appreciated that the vehicle position detection system of the present invention could take many different configurations depending upon its particular application. For example, more than three overlapping coverage zones could be used, particularly where it was desirable to cover more than two lanes of a roadway. Furthermore, in situations where lane changes are not permitted due to barriers between traffic lanes, two overlapping coverage zones would be sufficient for two travel lanes.

Figure 6:
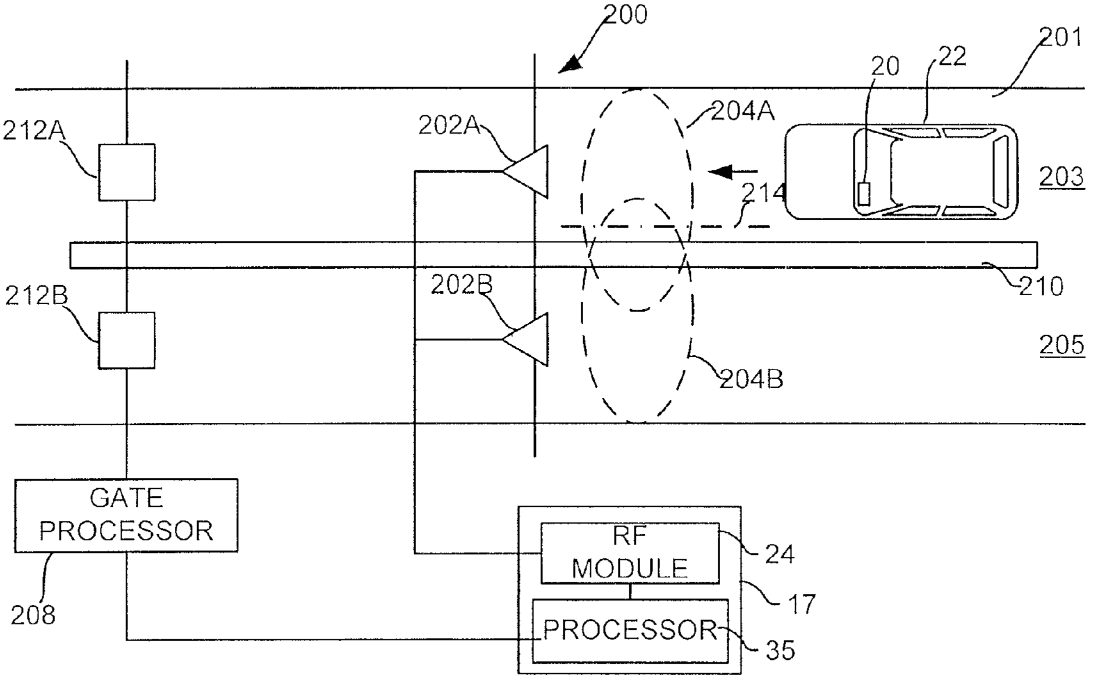
FIG. 6 is a plan view and block diagram showing an example embodiment of the vehicle position determination system in a separated lane, closed toll system.

In this regard, FIG. 6 illustrates a further embodiment of a vehicle position detection system 200 in accordance with the present invention. The vehicle position detection system 200 is the same as vehicle position detection system 10 described above except as noted below. Detection system 200 is used in a closed lane toll system wherein two adjacent exit lanes 203, 205 of roadway 201 are separated by a physical barrier 210. The presence of physical barrier 210 ensures that vehicles will not straddle the centre line between lanes 203 and 205, and accordingly only two coverage zones 204A and 204B, covered by roadway antennas 202A and 202B, respectively, are required to provide shoulder to shoulder coverage. The roadway antennas 202A and 202B are each connected to AVI reader 17, which causes each of the roadway antennas 202A and 202B to periodically transmit a unique identifier to a transponder 20 in a vehicle 22. The transponder 20 monitors the total number of each unique identifier that it has received and reports back to the AVI reader 17. The AVI reader 17 determines which of lanes 203 or 205 the transponder equipped vehicle 22 is in by determining which of the antennas 202A or 202B has the highest number of successful communications with the vehicle transponder 20 during the sampling period. For example, as shown in FIG. 6, the transponder 20 follows a path indicated by line 214, through both coverage zones 204A and 204B. The AVI reader 17 will conclude that the vehicle 22 is located in lane 203 as the total number of successful communications for antenna 202A will be greater than that for antenna 202B. The AVI reader 17 provides an electronic position report to a gate processor 208 which selectively raises physical barrier 212A or 212B depending upon the position determined by AVI reader 17.

The "averaged majority" and "averaged interpolation" algorithms suggested above are suitable for determining position when the coverage zones each have a generally uniform size and shape. The actual algorithm or method used to determine a position will depend upon a number of factors including the specific application of the vehicle position detection system, the shape and relative sizes of the coverage zones, and the degree of resolution needed for such application. For irregularly shaped coverage zones, the various different permutations and combinations of possible coverage zone counts, or ratios of coverage zone counts, for different possible vehicle paths through the coverage zones can be predetermined and provided to the processor 35 as a locally stored look-up table. As part of the position determination step, the processor 35 can compare the coverage zone counts, or ratios of coverage zone counts, as the case may be, to the look-up table to determine a vehicle position.

Although each of the antennas discussed above have been described as both transmitting and receiving, it is also possible that a single transmitting antenna could be used to transmit signals to all coverage zones, with each coverage zone being covered by a separate receive antenna.

Certain adaptations and modifications of the invention will be obvious to those skilled in the art when considered in light of this description. Therefore, the above discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A vehicle position determination system for determining a position of a moving vehicle having a transponder in a multi-lane roadway, the vehicle determination system comprising:

roadway antennas to receive a probable lane response signal from the transponder, the roadway antennas having partially overlapped coverage zones, each of the roadway antennas having a unique identifier associated therewith, the probable lane response signal being based on a plurality of counts corresponding to numbers of times the transponder has received a transmission from respective ones of the roadway antennas;

a controller to cause each of the roadway antennas to periodically transmit its unique identifier; and a lane determination module to determine the counts corresponding to the numbers of times that the transponder received a transmission from each of the roadway antennas based on the probable lane response signal, and to determine a position of the moving vehicle by comparing ratios of the numbers of times each unique identifier was received by the transponder during a sampling period to values associated with different possible transponder locations, wherein all of the coverage zones have similar elliptical shapes with major axes extending in a direction orthogonal to a travel path of the vehicle.

2. The vehicle position determination system claimed in claim 1, wherein:

the probable lane response signal comprises information indicating the counts of the numbers of times that each unique identifier has been received by the transponder; and the lane determination module is to determine the position of the moving vehicle by determining which unique identifier was received a greatest number of times during a sampling period.

3. The vehicle position determination system claimed in claim 1, wherein all of the coverage zones are approximately aligned side by side along an axis that is orthogonal to a direction of travel of the vehicle.

4. The vehicle position determination system claimed in claim 3, wherein the major axes are approximately linearly co-aligned.

5. The vehicle position determination system claimed in claim 1, wherein all of the coverage zones are of a similar size and shape.

6. A method of determining a position of a moving vehicle having a transponder in a multi-lane roadway, the multi-lane roadway having two or more roadway antennas having partially overlapped coverage zones, the method comprising:

receiving from a first one of the roadway antennas an RF trigger signal and a first the unique identifier associated with the first one of the roadway antenna antennas;

incrementing a first counter associated with the received first unique identifier in response to the receipt thereof;

generating a probable lane response signal based upon a value in the first counter and a value in a second counter, the second counter associated with a second~unique identifier;

transmitting the probable lane response signal to at least one of the roadway antennas;

determining numbers of times that the transponder received a transmission from corresponding ones of the roadway antennas based on the probable lane response signal; and determining a position of the moving vehicle by comparing ratios of the numbers of times corresponding ones of the unique identifiers were received by the transponder during a sampling period to values associated with different possible transponder locations;

wherein all of the coverage zones have similar elliptical shapes with major axes extending in a direction orthogonal to a travel path of the vehicle.

7. The method of claim 6, wherein generating the probable lane response signal includes identifying a counter having a highest value and wherein the probable lane response signal contains the unique identifier associated with the counter that has the highest value.

* * * * *